US012563607B2

(12) United States Patent
Cozzo et al.

(10) Patent No.: US 12,563,607 B2
(45) Date of Patent: Feb. 24, 2026

(54) METHOD AND APPARATUS FOR RANDOM ACCESS TRANSMISSIONS AND RECEPTIONS

(71) Applicant: Samsung Electronics Co., Ltd., Suwon-si (KR)

(72) Inventors: Carmela Cozzo, San Diego, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 567 days.

(21) Appl. No.: 18/054,889

(22) Filed: Nov. 11, 2022

(65) Prior Publication Data

US 2023/0171814 A1 Jun. 1, 2023

Related U.S. Application Data

(60) Provisional application No. 63/284,440, filed on Nov. 30, 2021, provisional application No. 63/308,378, filed on Feb. 9, 2022.

(51) Int. Cl.
H04W 74/0833 (2024.01)
H04W 16/28 (2009.01)
(Continued)

(52) U.S. Cl.
CPC ....... H04W 74/0841 (2013.01); H04W 16/28 (2013.01); H04W 72/1273 (2013.01);
(Continued)

(58) Field of Classification Search
CPC ......... H04W 74/0841; H04W 74/0866; H04W 74/006; H04W 74/0836; H04W 74/0833;
(Continued)

(56) References Cited

U.S. PATENT DOCUMENTS

2018/0035470 A1* 2/2018 Chen ................... H04W 74/006
2018/0235013 A1* 8/2018 Jung ................. H04W 74/0833
(Continued)

FOREIGN PATENT DOCUMENTS

WO 2021002714 A1 1/2021
WO 2021215834 A1 10/2021
WO 2021228249 A1 11/2021

OTHER PUBLICATIONS

"5G; NR; Physical channels and modulation (3GPP TS 38.211 version 17.3.0 Release 17)", ETSI TS 138 211 V17.3.0, Sep. 2022, 141 pages.

(Continued)

*Primary Examiner* — Ricardo H Castaneyra

(57) ABSTRACT

Timelines for transmissions and receptions in random access. A method includes transmitting a first physical random access channel (PRACH) preamble in a first PRACH occasion (RO) using a first spatial setting and a second PRACH preamble in a second RO using a second spatial setting. The method further includes determining a first time window over a first number of symbols for reception of a first physical downlink control channel (PDCCH) scheduling reception of a first physical downlink shared channel (PDSCH) using a first transmission configuration indication (TCI) state and a second time window over a second number of symbols for reception of a second PDCCH scheduling reception of a second PDSCH using a second TCI state. The method further includes receiving the first PDCCH and the first PDSCH using the first TCI state or the second PDCCH and the second PDSCH using the second TCI state.

17 Claims, 13 Drawing Sheets

700

710 UE is configured with a first and a second RAR windows by higher layer parameters *ra-ResponseWindow-TCI1* and *ra-ResponseWindow-TCI2*

720 UE transmits a first PRACH preamble in a first RO with a first spatial setting associated to a first TCI state and a second PRACH preamble in a second RO with a second spatial setting associated to a second TCI state 730 UE monitors the PDCCH for RARs corresponding to the first PRACH transmission while the *ra-ResponseWindow-TCI1* is running, and monitors the PDCCH for RARs corresponding to the second PRACH transmission while the *ra-ResponseWindow-TCI2* is running 740 UE receives an UL grant corresponding to the first PRACH transmission during the first RAR window, and receives an UL grant corresponding to the second PRACH transmission during the second RAR window

(51) Int. Cl.
  *H04W 72/1273*    (2023.01)
  *H04W 74/08*    (2009.01)
  *H04W 74/0836*    (2024.01)

(52) U.S. Cl.
  CPC ... *H04W 74/0833* (2013.01); *H04W 74/0866*
    (2013.01); *H04W 74/0836* (2024.01)

(58) Field of Classification Search
  CPC .............. H04W 74/004; H04W 16/28; H04W
      72/1273; H04W 72/0446; H04W 72/1268;
        H04W 72/23
  USPC ......................................... 370/329, 254, 503
  See application file for complete search history.

(56)         References Cited

U.S. PATENT DOCUMENTS

| | | | |
|---|---|---|---|
| 2019/0104549 A1* | 4/2019 | Deng | .................. H04W 72/046 |
| 2021/0051707 A1 | 2/2021 | Rastegardoost et al. | |
| 2021/0051736 A1* | 2/2021 | Jeon | ....................... H04W 76/11 |
| 2021/0329699 A1* | 10/2021 | Zhou | ....................... H04B 7/088 |
| 2023/0188261 A1* | 6/2023 | Awadin | ...................... H04L 1/08 |
| | | | 370/329 |
| 2024/0260093 A1* | 8/2024 | Gu | ........................ H04L 5/1469 |

OTHER PUBLICATIONS

"5G; NR; Multiplexing and channel coding (3GPP TS 38.212 version 17.3.0 Release 17)", ETSI TS 138 212 V17.3.0, Sep. 2022, 206 pages.

"5G; NR; Physical layer procedures for control (3GPP TS 38.213 version 17.3.0 Release 17)", ETSI TS 138 213 V17.3.0, Sep. 2022, 262 pages.

"5G; NR; Physical layer procedures for data (3GPP TS 38.214 version 17.3.0 Release 17)", ETSI TS 138 214 V17.3.0, Sep. 2022, 237 pages.

"3rd Generation Partnership Project; Technical Specification Group Radio Access Network; NR; Medium Access Control (MAC) protocol specification (Release 17)", 3GPP TS 38.321 V17.2.0, Sep. 2022, 246 pages.

"3rd Generation Partnership Project; Technical Specification Group Radio Access Network; NR; Radio Resource Control (RRC) protocol specification (Release 17)", 3GPP TS 38.331 V17.2.0, Sep. 2022, 1298 pages.

Extended European Search Report issued Oct. 4, 2024 regarding Application No. 22901725.6, 11 pages.

MediaTek Inc., "Remaining details on RACH procedure", 3GPP TSG RAN WG1 Meeting #92bis, R1-1805524, Apr. 2018, 15 pages.

Qualcomm Incorporated, "Remaining Details on QCL", 3GPP TSG-RAN WG1 Meeting #93, R1-1807398, May 2018, 10 pages.

Ericsson, "Enhancements to initial access procedure", 3GPP TSG-RAN WG1 Meeting #99, R1-1912710, Nov. 2019, 24 pages.

International Search Report and Written Opinion issued Mar. 13, 2023 regarding International Application No. PCT/KR2022/019096, 9 pages.

Moderator (Samsung), "Moderator summary#5 for multi-beam enhancement: ROUND 4", 3GPP TSG RAN WG1 #106-e, R1-2108557, Aug. 2021, 22 pages.

* cited by examiner

700

710  UE is configured with a first and a second RAR windows by higher layer parameters *ra-ResponseWindow-TCI1* and *ra-ResponseWindow-TCI2*

720  UE transmits a first PRACH preamble in a first RO with a first spatial setting associated to a first TCI state and a second PRACH preamble in a second RO with a second spatial setting associated to a second TCI state 730  UE monitors the PDCCH for RARs corresponding to the first PRACH transmission while the *ra-ResponseWindow-TCI1* is running, and monitors the PDCCH for RARs corresponding to the second PRACH transmission while the *ra-ResponseWindow-TCI2* is running 740  UE receives an UL grant corresponding to the first PRACH transmission during the first RAR window, and receives an UL grant corresponding to the second PRACH transmission during the second RAR window

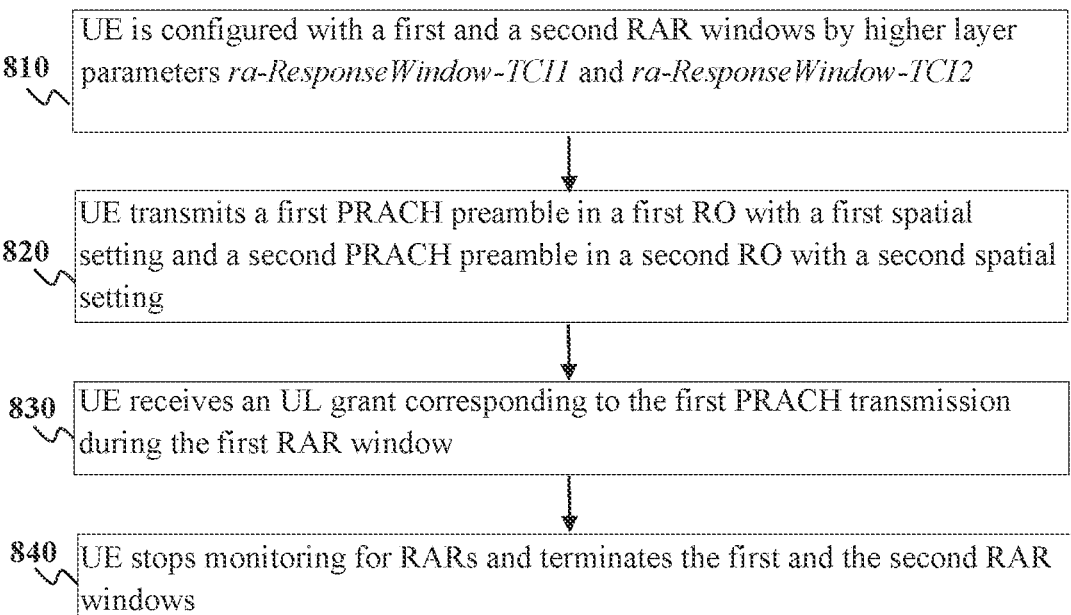

810  UE is configured with a first and a second RAR windows by higher layer parameters *ra-ResponseWindow-TCI1* and *ra-ResponseWindow-TCI2*

820  UE transmits a first PRACH preamble in a first RO with a first spatial setting and a second PRACH preamble in a second RO with a second spatial setting 830  UE receives an UL grant corresponding to the first PRACH transmission during the first RAR window 840  UE stops monitoring for RARs and terminates the first and the second RAR windows

FIG. 8

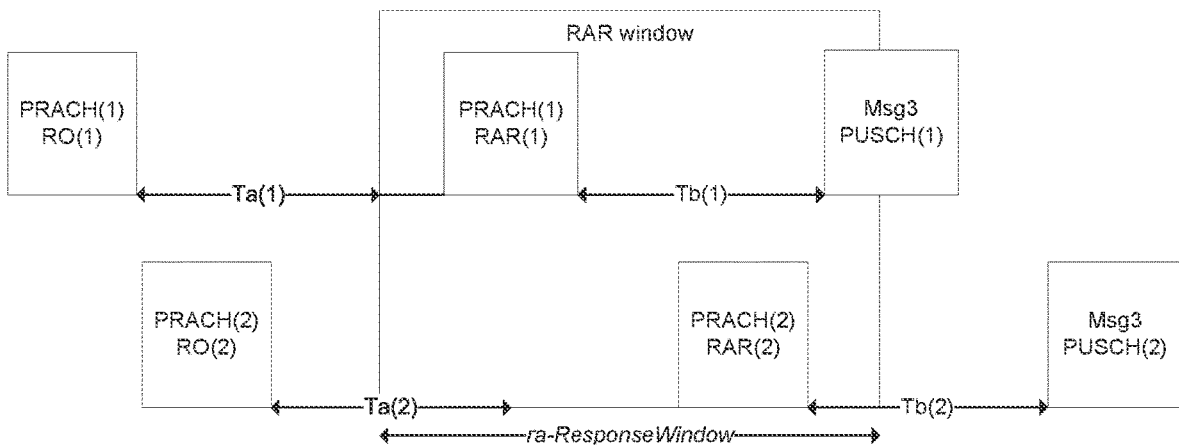
FIG. 9

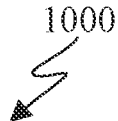

1000

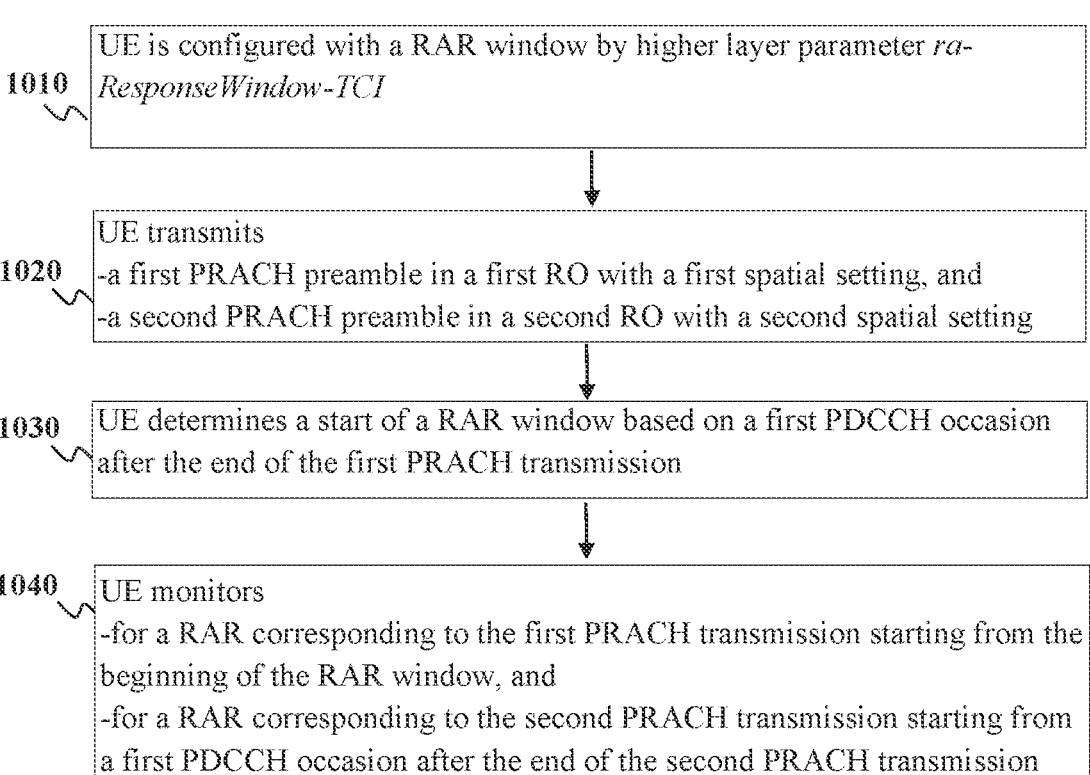

1010 — UE is configured with a RAR window by higher layer parameter *ra-ResponseWindow-TCI*

1020 — UE transmits
-a first PRACH preamble in a first RO with a first spatial setting, and
-a second PRACH preamble in a second RO with a second spatial setting 1030 — UE determines a start of a RAR window based on a first PDCCH occasion after the end of the first PRACH transmission 1040 — UE monitors
-for a RAR corresponding to the first PRACH transmission starting from the beginning of the RAR window, and
-for a RAR corresponding to the second PRACH transmission starting from a first PDCCH occasion after the end of the second PRACH transmission

FIG. 10

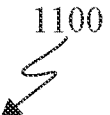
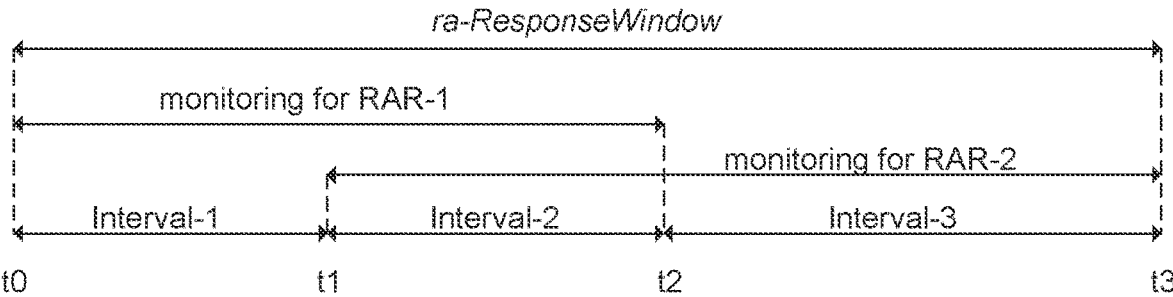
FIG. 11

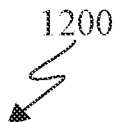

1200

1210  UE is configured with a RAR window by higher layer parameter *ra-ResponseWindow*

1220  UE transmits a first PRACH preamble in a first RO with a first spatial setting and a second PRACH preamble in a second RO with a second spatial setting 1230  UE monitors for RARs corresponding to the first and second PRACH transmissions starting from a first PDCCH occasion after the end of the second PRACH transmission 1240  UE receives an UL grant corresponding to the first PRACH transmission, and stops monitoring for RAR corresponding to the first PRACH transmission 1250  *Configuration-A?*   YES →  1260  UE stops monitoring for RAR corresponding to the second PRACH transmission and terminates the RAR window

NO

1270  UE monitors for RAR corresponding to the second PRACH transmission

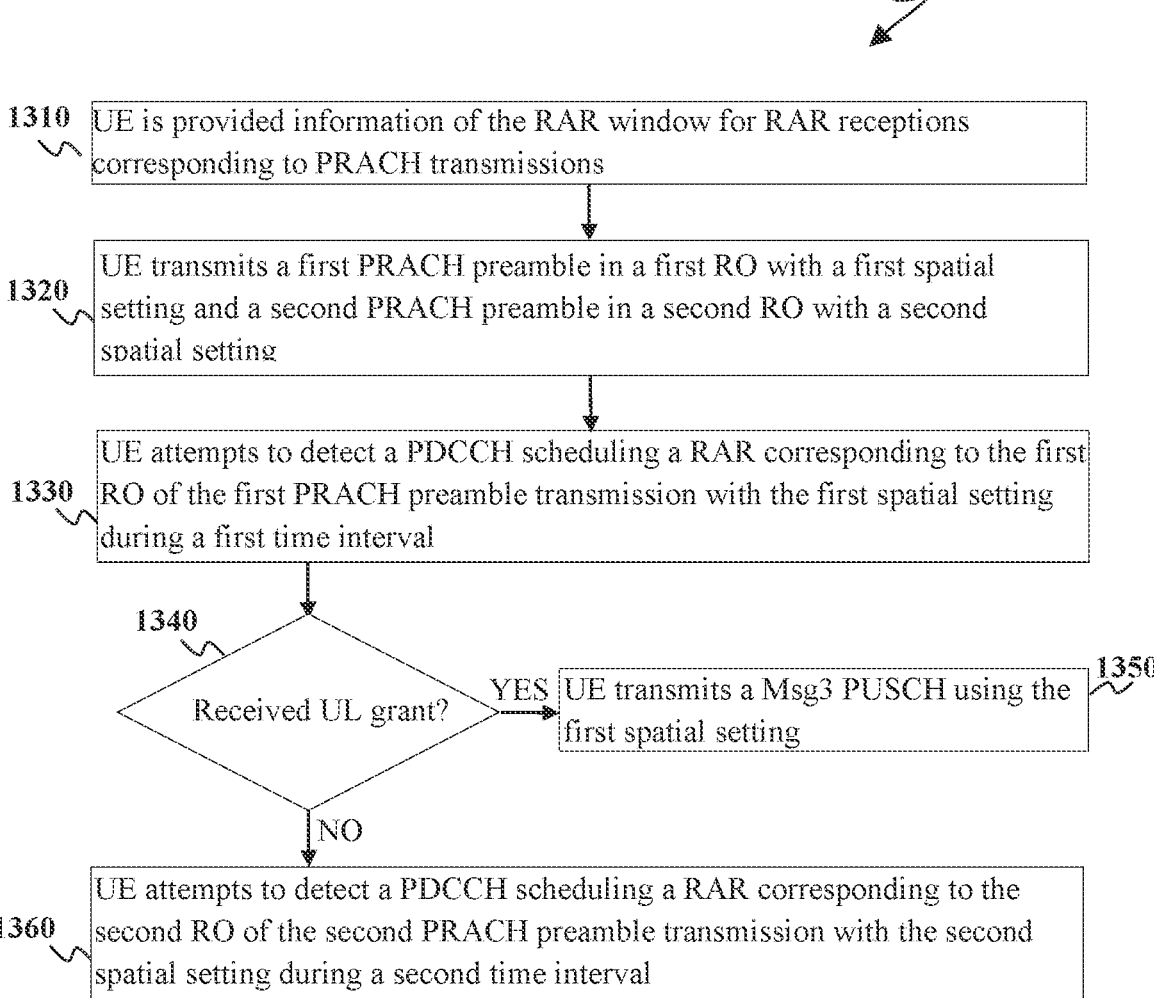

1310 UE is provided information of the RAR window for RAR receptions corresponding to PRACH transmissions 1320 UE transmits a first PRACH preamble in a first RO with a first spatial setting and a second PRACH preamble in a second RO with a second spatial setting 1330 UE attempts to detect a PDCCH scheduling a RAR corresponding to the first RO of the first PRACH preamble transmission with the first spatial setting during a first time interval 1340 Received UL grant?

YES   1350 UE transmits a Msg3 PUSCH using the first spatial setting

NO

1360 UE attempts to detect a PDCCH scheduling a RAR corresponding to the second RO of the second PRACH preamble transmission with the second spatial setting during a second time interval

FIG. 13

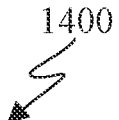

1400

1410    UE is provided information of the RAR window for RAR receptions corresponding to PRACH transmissions 1420    UE transmits a number $N$ of PRACH preambles in corresponding $N$ ROs using $N$ spatial settings 1430    UE attempts to detect a PDCCH scheduling a RAR corresponding to a PRACH preamble transmission during a time interval within the RAR window 1440    UE receives a first UL grant corresponding to the first PRACH transmission and transmits a Msg3 PUSCH based on the received first UL grant using the first spatial setting 1450    UE receives a second uplink grant corresponding to the second PRACH transmission 1460    HARQ-ACK for Msg3 PUSCH?

YES → RANDOM ACCESS PROCEDURE IS COMPLETE    1470

NO

1480    UE transmits a Msg3 PUSCH based on the received second uplink grant using the second spatial setting

FIG. 14

METHOD AND APPARATUS FOR RANDOM ACCESS TRANSMISSIONS AND RECEPTIONS

CROSS-REFERENCE TO RELATED APPLICATION AND CLAIM OF PRIORITY

This application claims priority under 35 U.S.C. § 119 (e) to U.S. Provisional Patent Application No. 63/284,440 filed on Nov. 30, 2021, and U.S. Provisional Patent Application No. 63/308,378 filed on Feb. 9, 2022. The above-identified provisional patent applications are hereby incorporated by reference in their entireties.

TECHNICAL FIELD

The present disclosure relates generally to wireless communication systems and, more specifically, the present disclosure relates to timelines for transmissions and receptions in random access.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to timelines for transmissions and receptions in random access.

In one embodiment, a user equipment (UE) is provided. The UE includes a transceiver configured to transmit a first physical random access channel (PRACH) preamble in a first PRACH occasion (RO) using a first spatial setting and a second PRACH preamble in a second RO using a second spatial setting. The UE further includes a processor operably coupled to the transceiver. The processor is configured to determine a first time window over a first number of symbols for reception of a first physical downlink control channel (PDCCH) scheduling reception of a first physical downlink shared channel (PDSCH) using a first transmission configuration indication (TCI) state and a second time window over a second number of symbols for reception of a second PDCCH scheduling reception of a second PDSCH using a second TCI state. The first PDSCH provides a first random access response (RAR) message associated with the first PRACH preamble transmission. The second PDSCH provides a second RAR message associated with the second PRACH preamble transmission. The transceiver is further configured to receive the first PDCCH using the first TCI state and the first PDSCH or the second PDCCH and the second PDSCH using the second TCI state.

In another embodiment, a base station (BS) is provided. The BS includes a transceiver configured to receive a first PRACH preamble in a first RO using a first spatial setting and a second PRACH preamble in a second RO using a second spatial setting. The BS further includes a processor operably coupled to the transceiver, the processor configured to determine a first time window over a first number of symbols for reception of a first PDCCH scheduling reception of a first PDSCH using a first TCI state and a second time window over a second number of symbols for reception of a second PDCCH scheduling reception of a second PDSCH using a second TCI state. The first PDSCH provides a first RAR message associated with the first PRACH preamble reception. The second PDSCH provides a second RAR message associated with the second PRACH preamble reception. The transceiver is further configured to transmit the first PDCCH and the first PDSCH using the first TCI state or the second PDCCH and the second PDSCH using the second TCI state.

In yet another embodiment, a method is provided. The method includes transmitting a first PRACH preamble in a first RO using a first spatial setting and a second PRACH preamble in a second RO using a second spatial setting. The method further includes determining a first time window over a first number of symbols for reception of a first PDCCH scheduling reception of a first PDSCH using a first TCI state and a second time window over a second number of symbols for reception of a second PDCCH scheduling reception of a second PDSCH using a second TCI state. The first PDSCH provides a first RAR message associated with the first PRACH preamble transmission. The second PDSCH provides a second RAR message associated with the second PRACH preamble transmission. The method further includes receiving the first PDCCH and the first PDSCH using the first TCI state or the second PDCCH and the second PDSCH using the second TCI state.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates an example method for a UE to monitor a PDCCH for RARs corresponding to a first PRACH transmission using a first spatial setting associated with a first TCI state and a second PRACH transmission using a second spatial setting associated with a second TCI state in a first and in a second RAR window, respectively, according to embodiments of the present disclosure;

FIG. 8 illustrates another example method for a UE to monitor a PDCCH for RARs corresponding to a first and a second PRACH transmission in a first and in a second RAR window, respectively, according to embodiments of the present disclosure;

FIG. 9 illustrates an example where a UE transmits a first PRACH preamble in a first RO with a first spatial setting and a second PRACH preamble in a second RO with a second spatial setting, where the second RO is after the first RO, and is configured with one RAR window according to embodiments of the disclosure;

FIG. 10 illustrates an example method for a UE to monitor a PDCCH for RARs corresponding to a first and a second PRACH transmission during one RAR window according to embodiments of the disclosure;

FIG. 11 illustrates an example for a UE to monitor a PDCCH for RARs corresponding to a first and a second PRACH transmission during one RAR window according to embodiments of the present disclosure;

FIG. 12 illustrates an example method for a UE to monitor for RARs corresponding to a first PRACH transmission and a second PRACH transmission during one RAR window, wherein the first and second PRACH transmission can be transmitted in ROs in the same time resource and different frequency resources, and monitoring for RAR starts after transmission in the second RO, according to embodiments of the disclosure;

FIG. 13 illustrates an example method for a UE to receive an RAR according to embodiments of the disclosure; and FIG. 14 illustrates another example method for a UE to receive an RAR according to embodiments of the disclosure.

DETAILED DESCRIPTION

Figure 1:
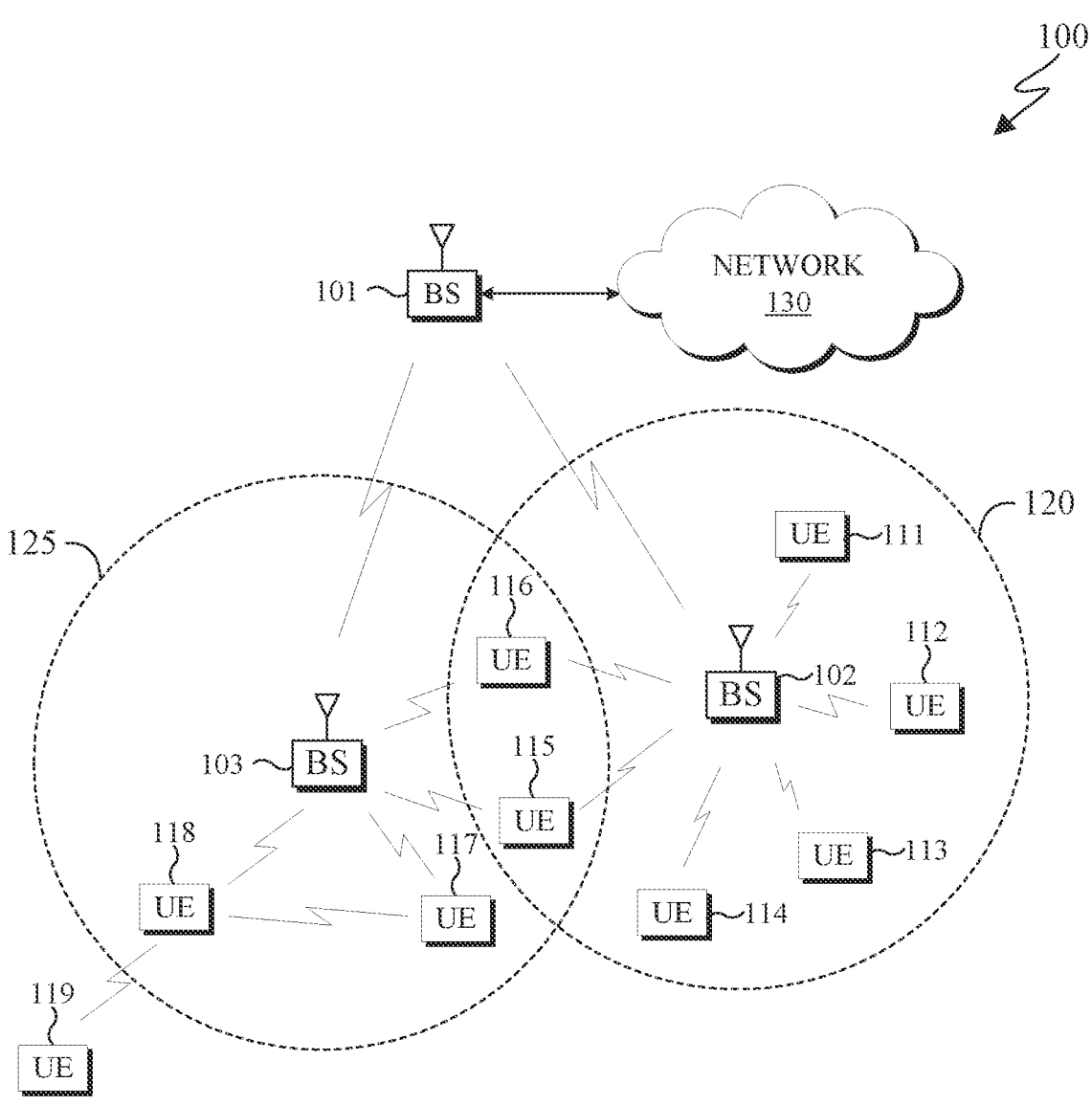
FIG. 1 illustrates an example wireless network according to embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v17.3.0, "NR; Physical channels and modulation" ("REF1"); 3GPP TS 38.212 v17.3.0, "NR; Multiplexing and channel coding" ("REF2"); 3GPP TS 38.213 v17.3.0, "NR; Physical layer procedures for control" ("REF3"); 3GPP TS 38.214 v17.3.0, "NR; Physical layer procedures for data" ("REF4"); 3GPP TS 38.321 v17.2.0, "NR; Medium Access Control (MAC) protocol specification" ("REF5"); and 3GPP TS 38.331 v17.2.0, "NR; Radio Resource Control (RRC) protocol specification" ("REF6").

The present disclosure relates to a random access procedure for a UE to establish RRC connection with a serving gNB wherein the random access procedure includes a transmission of a PRACH from the UE, an RAR reception by the UE in response to the PRACH transmission and, for a contention based random access, a Msg3 PUSCH transmission from the UE for contention resolution. The present disclosure relates to determining a timeline for transmission of a PRACH preamble with a spatial setting in a RACH occasion (RO) and corresponding RAR reception in response to the PRACH transmission. The present disclosure also relates to determining one or multiple RAR windows for monitoring RARs corresponding to PRACH transmissions with multiple spatial settings wherein multiple RAR windows can be active at the same time. The present disclosure further relates to determining a timeline for transmission of a Msg3 PUSCH.

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance.

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
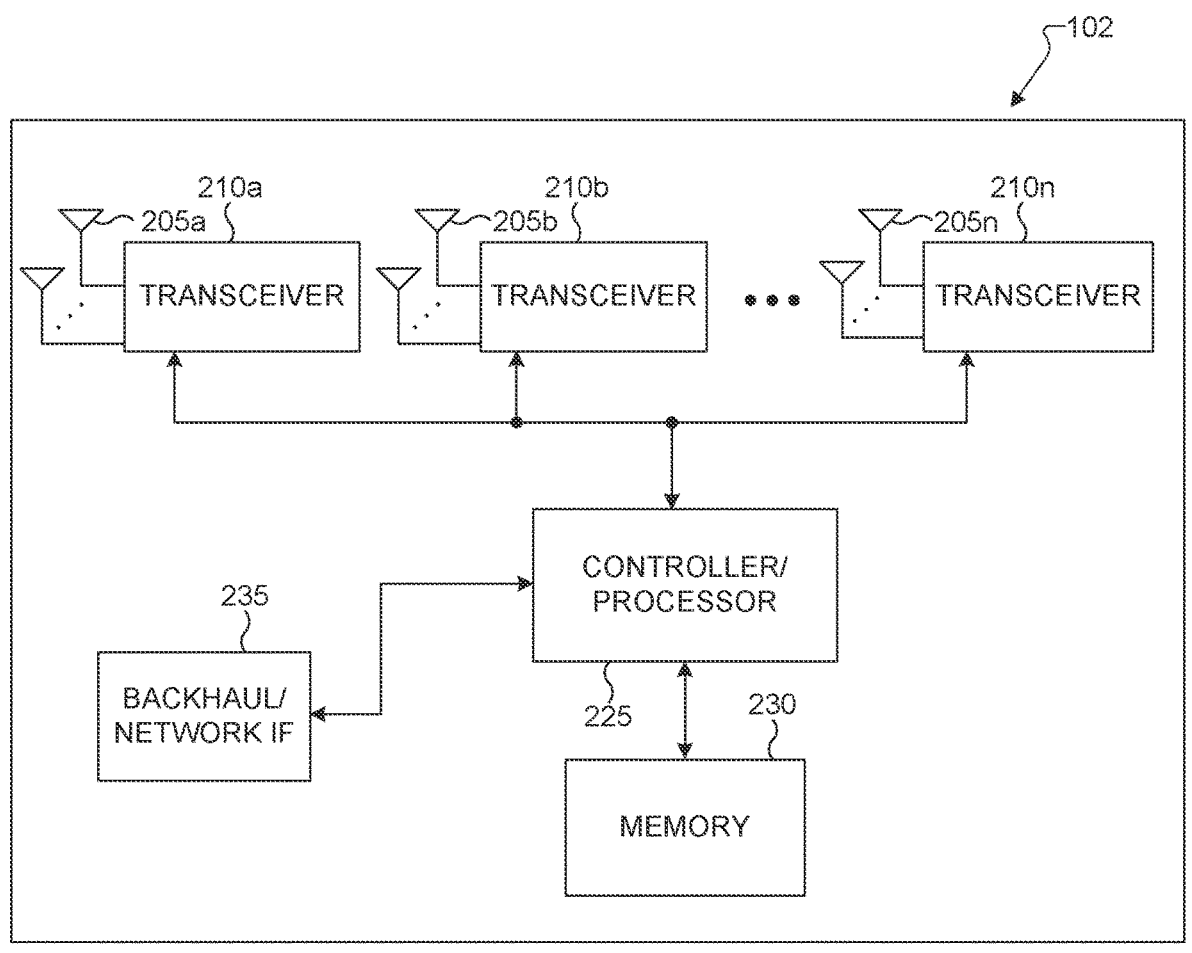
FIG. 2 illustrates an example base station (BS) according to embodiments of the present disclosure.
Figure 3:
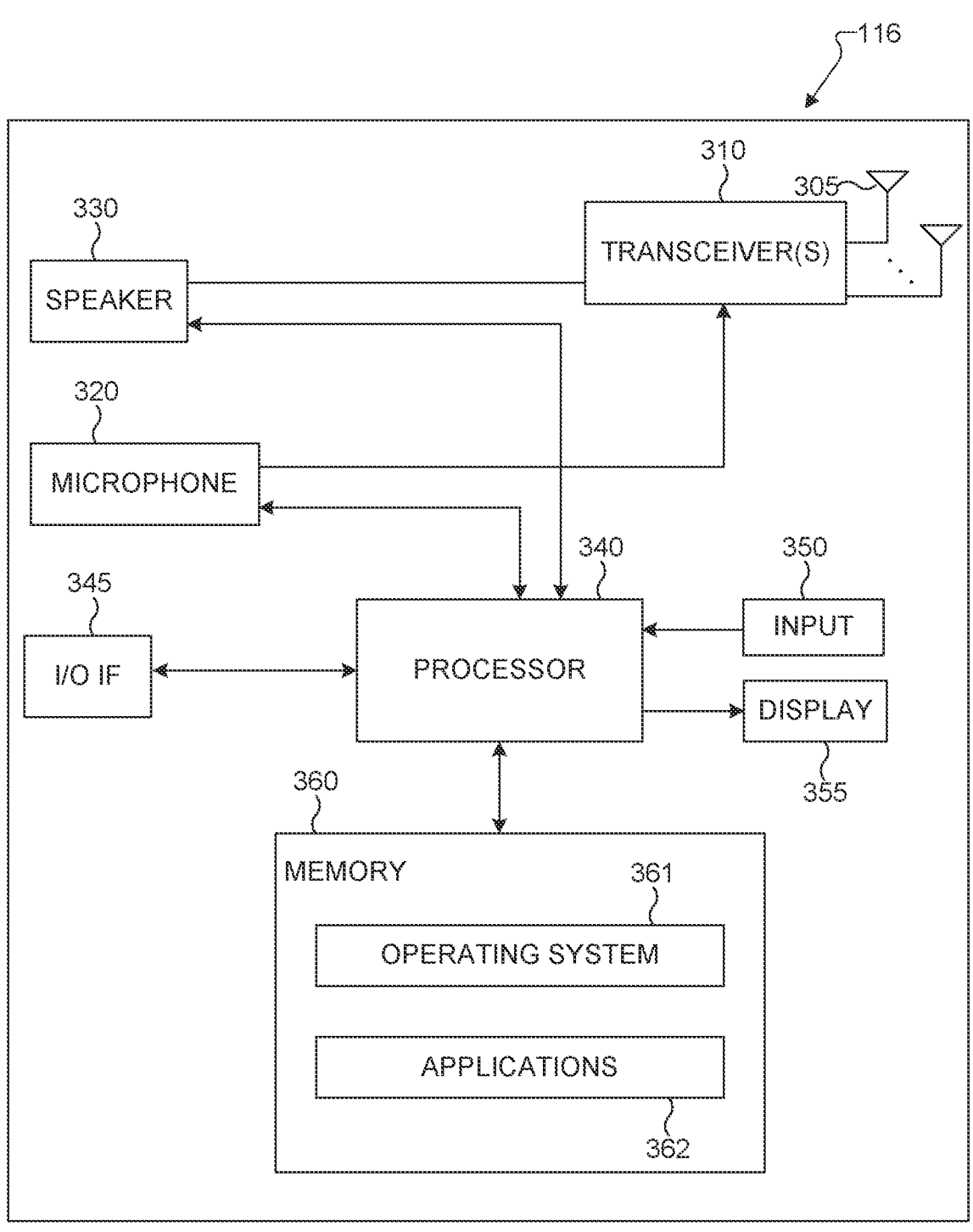
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, LTE, long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for using timelines for transmissions and receptions in random access. In certain embodiments, and one or more of the BSs 101-103 includes circuitry, programing, or a combination thereof for triggering methods for timelines for transmissions and receptions in random access.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support use of timelines for transmissions and receptions in random access. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
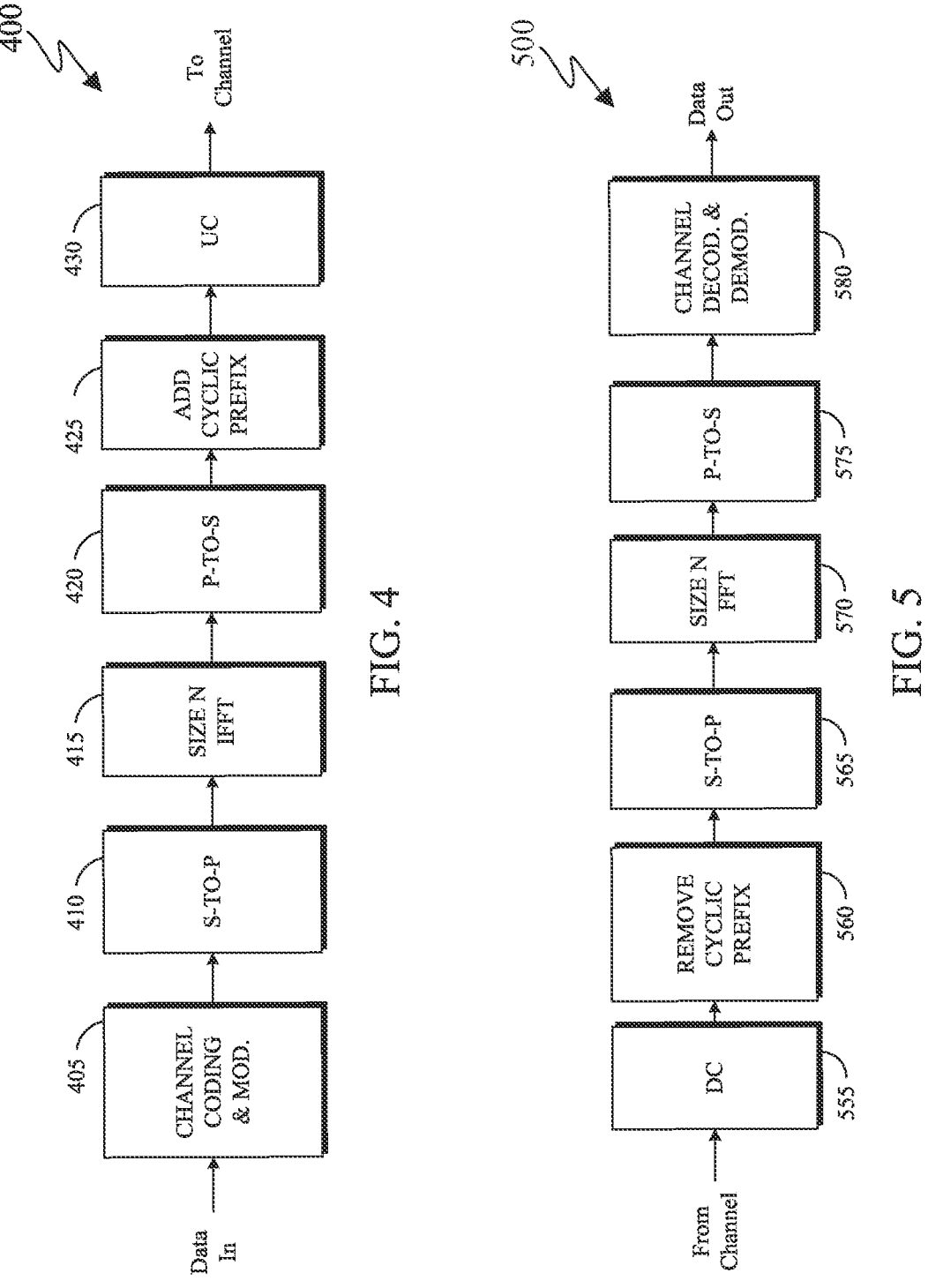
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support use of timelines for transmissions and receptions in random access as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the downconverter 555 downconverts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A random access (RA) procedure can be initiated by radio resource control (RRC) for a system information (SI)

request if a system information block 1 (SIB1) includes scheduling information for an on-demand SI request, by a medium access control (MAC), or by a Physical Downlink Control Channel (PDCCH) order. The RA procedure can be initiated due to a variety of triggers or purposes. For example, the RA procedure can be initiated for initial access to establish an RRC connection, where a user equipment (UE) transitions from an RRC_IDLE state to an RRC_CO-NNECTED state, to re-establish an RRC connection after radio link failure (RLF), for an on-demand SI request, or for hand-over. In addition, the RA procedure can be initiated for purposes such as uplink (UL) synchronization, scheduling request (SR), positioning, or link recovery referred to herein as beam failure recovery (BFR).

The RA can operate in at least two modes. A first mode is contention-based random access (CBRA) where UEs transmitting to a same serving cell can share same RA resources and, accordingly, there is a possibility of collision among RA attempts from different UEs. A second mode is contention-free random access (CFRA) where a UE has dedicated RA resources that are indicated by a serving gNB and may not be shared with other UEs so that RA collisions can be avoided.

A four-step RA procedure, also known as a Type-1 (L1) random access procedure, includes a transmission of a physical random access channel (PRACH) preamble (Msg1), an attempt to receive a random access response (RAR or Msg2), a transmission of a contention resolution message (Msg3), and an attempt to receive a contention resolution message (Msg4). An alternative RA procedure can include only two steps, referred to herein as two-step RACH or a Type-2 L1 random access procedure. In two step RACH, Msg1 and Msg3 are combined into a MsgA transmission and Msg2 and Msg4 above are combined into a MsgB reception. MsgA combines a PRACH preamble transmission in a RACH occasion (RO) along with a PUSCH transmission in a so-called PUSCH occasion (PO). The mapping between ROs and POs can be one-to-one, many-to-one, or one-to-many.

The disclosure considers a four-step RA procedure and embodiments for determining a timeline for transmissions and receptions during random access when a PRACH preamble is transmitted in an RO with a spatial setting herein described for four-step RACH can generally apply also to determining a timeline for a MsgA transmission for a two-step RACH. Descriptions of transmission settings for a Msg3 PUSCH transmission upon reception of an RAR for four-step RACH can apply to a PUSCH transmission upon reception of an RAR indicating a successful decoding of the MsgA PUSCH transmission for the two-step RACH.

During initial cell search, a UE acquires/detects a synchronization signal/physical broadcast channel (SS/PBCH) block transmitted by a serving gNB. The gNB can transmit multiple SS/PBCH blocks with different quasi-collocation properties (beams). The UE typically acquires a SS/PBCH block corresponding to a largest signal to interference and noise ratio (SINR). In case of reciprocal reception/transmission quasi-collocation properties at the UE, the SS/PBCH block that the UE detects has quasi-collocation properties that best match the ones of transmissions from the UE. Then, the UE can transmit PRACH according to the spatial setting that is determined from the detected SS/PBCH block.

The UE can transmit a PRACH with a narrow beam and change the spatial setting of the PRACH transmission when the UE does not detect an RAR message addressing the UE in response to a PRACH transmission. The UE can also perform sweeping over multiple spatial settings for PRACH transmissions. The gNB may be able to detect one or more of the UE transmissions, and based on the configuration of the PRACH transmission, the gNB can transmit one or more RARs to the UE. When the UE does not receive an RAR, either because the gNB has not detected a PRACH preamble from the UE, for example because a corresponding spatial setting used by the UE does not provide sufficiently large SINR, or because although the gNB has successfully detected the PRACH preamble from the UE and has transmitted an RAR to the UE, the UE has not received the RAR, for example because a corresponding spatial setting used by the gNB does not provide sufficiently large SINR, the UE may restart the RA procedure by transmitting another PRACH preamble. When an RAR is successfully received by the UE, the UE transmits a Msg3. When the Msg3 is not correctly received by the gNB, the UE may have transmitted Msg3 using a spatial setting that does not provide sufficiently large SINR. The gNB can schedule a Msg3 retransmission from the UE, but the Msg3 retransmission from the UE would typically need to be with a spatial setting that provides sufficiently large SINR in order to be correctly received by the gNB.

Therefore, there is a need to define timelines for a UE to transmit multiple PRACH transmissions using multiple spatial settings, to receive one or more RAR messages in response to corresponding PRACH transmissions, and to transmit a Msg3 PUSCH that is received with a sufficiently large SINR at a serving gNB.

The present disclosure relates to a random access procedure for a UE to establish RRC connection with a serving gNB wherein the random access procedure includes a transmission of a PRACH from the UE, an RAR reception by the UE in response to the PRACH transmission and, for a contention based random access, a Msg3 PUSCH transmission from the UE for contention resolution. The disclosure relates to determining a timeline for transmission of a PRACH preamble with a spatial setting in a RACH occasion (RO) and corresponding RAR reception in response to the PRACH transmission. The disclosure also relates to determining one or multiple RAR windows for monitoring RARs corresponding to PRACH transmissions with multiple spatial settings wherein multiple RAR windows can be active at the same time. The disclosure further relates to determining a timeline for transmission of a Msg3 PUSCH.

A physical random access procedure is triggered upon request of a PRACH transmission by higher layers or by a PDCCH order. A configuration by higher layers for a PRACH transmission comprises a preamble index, a preamble SCS, a transmission power $P_{PRACH,target}$, a corresponding RA-RNTI, and a PRACH resource. The UE determines a power for a PRACH transmission on the indicated PRACH resource. The UE can be provided a number N of SS/PBCH block indices associated with one RO and a number R of contention based preambles per SS/PBCH block index per valid RO by ssb-perRACH-Occasio-nAndCB-PreamblesPerSSB. Depending on the configured values of N and R and on an ordering of preamble indices within a single RO, frequency resource indices for frequency multiplexed ROs, time resource indices for time multiplexed ROS within a PRACH slot and indices for PRACH slots, the UE determines valid ROs associated with SS/PBCH block indices and PRACH preamble indices.

ROs are mapped consecutively per corresponding SS/PBCH block index. For a PRACH transmission the UE selects the RO indicated by a PRACH mask index value for the indicated SS/PBCH block index. For PRACH transmissions with multiple spatial settings, the UE can select PRACH preambles and ROs from the determined set of PRACH preambles and ROs associated to SS/PBCH block indices, and transmit PRACH transmissions using different spatial settings.

A UE can be configured to transmit PRACH using S spatial settings, wherein the value S is configured in SIB and can be a field in the Information Element (IE) RACH-ConfigCommon that is used to specify the cell specific random access parameters or in IE RACH-ConfigGeneric that is used to specify the random access parameters for regular random access and for beam failure recovery. It is also possible that the value S indicates a maximum number of spatial settings that a UE can use for PRACH transmissions. Then the UE determines the number of spatial settings and the spatial settings to be used for PRACH transmissions based on RSRP measurements of SS/PBCH blocks, and/or of receptions of CSI-RS resource, if configured. In this disclosure S is used for the configured or actual number of spatial settings for PRACH transmissions interchangeably.

In one example of PRACH transmission, the association SS/PBCH block indexes and ROs is a 1-to-1 mapping, and one PRACH preamble is associated to an RO. When a UE is configured to transmit using S spatial settings:

a) the UE can transmit S PRACH preambles in S ROs by cycling over S spatial settings, or b) the UE can repeat a number of times the transmission of a first PRACH preamble in a first RO using a first spatial setting, and then repeat the same number of times the transmission of a second PRACH preamble in a second RO using a second spatial setting, and so on until transmitting an S-th PRACH preamble in an S-th RO with an S-th spatial settings, or c) the UE can transmit S PRACH preambles in corresponding S ROs by cycling over different S spatial settings, and then repeat the S transmissions a number of times.

In another example of PRACH transmission, an SS/PBCH block index is associated to multiple ROs, and each RO of the multiple ROs is associated to a same PRACH preamble, and the UE can transmit the PRACH preamble in the different ROs using the S spatial settings as described in a), b) or c) above.

In yet another example of PRACH transmission, an SS/PBCH block index is associated to multiple ROs, and each RO of the multiple ROs is associated to different PRACH preambles, and the UE can transmit the PRACH preambles in the different ROs using the S spatial settings as described in a), b) or c) above.

In the following, for brevity, the descriptions consider transmissions of two PRACH preambles in two ROs using two spatial settings but are directly applicable to transmissions of a number N larger than two PRACH preambles in N ROs using N spatial settings.

In response to a PRACH transmission, a UE attempts to detect a DCI format 1_0 with CRC scrambled by a corresponding RA-RNTI during an RAR window controlled by higher layers. For multiple PRACH transmissions with different spatial settings, the UE is configured multiple search space sets associated with different TCI states, corresponding to different spatial settings, configured for different CORESETs where the UE receives multiple PDCCHs for the corresponding multiple search space sets. When the UE transmits multiple PRACH transmissions with different spatial settings, the UE can be configured with one or multiple RAR windows. For example, when a UE is configured to transmit with a first and a second spatial setting, wherein one or multiple PRACH transmission(s) is/are transmitted with the first spatial setting and one or multiple PRACH transmission(s) is/are transmitted with the second spatial setting, a first RAR window can be configured for attempting reception of one or multiple RARs corresponding to the one or multiple PRACH transmissions with the first spatial setting or equivalently, associated with a first TCI state, and a second RAR window can be configured for attempting reception of one or multiple RARs corresponding to the one or multiple PRACH transmissions with the second spatial setting or equivalently, associated with a second TCI state. A length of the first and second RAR window can be the same or different, and can be provided by ra-Response-Window-TCI. The parameter ra-ResponseWindow-TCI can provide one value for the length of the RAR window that applies to both the first RAR window and to the second RAR window, wherein first and second RAR windows correspond to monitoring for RARs to PRACH transmissions with first and second spatial settings, respectively. It is also possible that different RAR window lengths are provided for RAR windows corresponding to PRACH transmission with different spatial settings. For example, ra-Response Window-TCI can provide a first value for the length of the first RAR window associated with the first TCI state corresponding to the first spatial setting, and a second value for the length of the second RAR window associated with the second TCI state corresponding to the second spatial setting. Similarly, when the UE transmits with S spatial settings, ra-Response Window-TCI can provide same or different RAR window lengths for the corresponding S RAR windows that can be configured per UL BWP. It is also possible that separate higher layer parameters are used to provide the length of each RAR window, and be configured per spatial setting. The UE can also be configured with one RAR window for monitoring RARs corresponding to any of the PRACH transmissions with same or different spatial settings. The length of the RAR window in number of slots can be provided by ra-ResponseWindow which can be a separate parameter from the parameter that indicates the length of the RAR window when the UE transmits one or more PRACH preambles in one or more ROs with a same spatial setting. It is also possible that the configuration of multiple RAR windows (with either the same or different RAR window length) depends on the UE operating on multiple cells, such as for operation with carrier aggregation, or operating with multiple transmission/reception points (TRPs) with single or multiple transmission panels, wherein simultaneous transmission from multiple panels may or may not be possible, or may or may not be configured.

When a UE is configured to transmit PRACH transmissions using multiple spatial settings, the UE can transmit a first PRACH preamble in a first RO with a first spatial setting and a second PRACH preamble in a second RO with a second spatial setting. In response to the first PRACH transmission of the first PRACH preamble in the first RO with the first spatial setting, the UE attempts to detect a DCI format 1_0 with CRC scrambled by a corresponding RA-RNTI during a first RAR window that starts at the first symbol of the earliest CORESET the UE is configured to receive PDCCH for Type1-PDCCH CSS set associated to the first spatial setting, or equivalently to a corresponding first TCI state, that is at least one symbol, after the last symbol of the first RO corresponding to the first PRACH transmission with the first spatial setting. The window starts after an additional TTA+$k_{mac}$ msec where TTA is a timing advance between downlink and uplink and $k_{mac}$ is a number of slots provided by K-Mac or $k_{mac}$=0 if K-Mac is not provided. In response to the second PRACH transmission of the second PRACH preamble in the second RO with the second spatial setting, the UE attempts to detect a DCI format 1_0 with CRC scrambled by a corresponding RA-RNTI during a second RAR window that starts at the first symbol of the CORESET (associated with the search space set configured for the second TCI state) the UE is configured to receive PDCCH for Type1-PDCCH CSS set associated to the second spatial setting, or equivalently to a corresponding second TCI state, that is at least one symbol, after the last symbol of the second RO corresponding to the second PRACH transmission with the second spatial setting.

If the UE does not detect the DCI format 1_0 with CRC scrambled by the corresponding RA-RNTI within the first RAR window, or if the UE detects the DCI format 1_0 with CRC scrambled by the corresponding RA-RNTI within the first RAR window and LSBs of a SFN field in the DCI format 1_0, if included and applicable, are not the same as corresponding LSBs of the SFN where the UE transmitted PRACH, or if the UE does not correctly receive the transport block in the corresponding PDSCH within the first window, or if the higher layers do not identify the RAPID associated with the PRACH transmission from the UE, then the PRACH transmission is considered not successful.

If the UE detects the DCI format 1_0 with CRC scrambled by the corresponding RA-RNTI within the first RAR window and LSBs of a SFN field in the DCI format 1_0, if included and applicable, are the same as corresponding LSBs of the SFN where the UE transmitted the first PRACH preamble in the first RO with the first spatial setting, and the UE receives a transport block in a corresponding PDSCH within the first window, the UE passes the transport block to higher layers. The higher layers parse the transport block for a random-access preamble identity (RAPID) associated with the PRACH transmission. If the higher layers identify the RAPID in RAR message(s) of the transport block, the higher layers indicate an uplink grant to the physical layer, and the PRACH transmission is considered successful.

Figure 6:
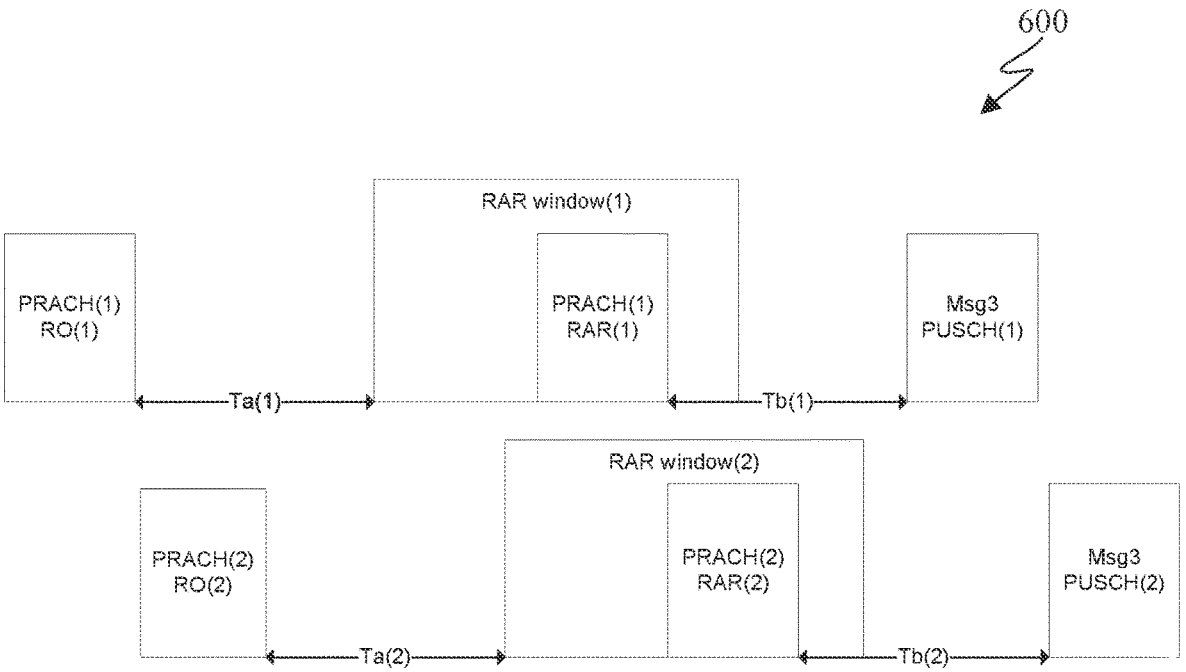
FIG. 6 illustrates an example where the UE transmits a first PRACH preamble in a first RO with a first spatial setting and a second PRACH preamble in a second RO with a second spatial setting according to embodiments of the present disclosure.

FIG. 6 illustrates an example 600 of multiple RAR windows where a UE transmits a first PRACH preamble in a first RO with a first spatial setting and a second PRACH preamble in a second RO with a second spatial setting according to embodiments of the disclosure. The embodiment of the example 600 of multiple RAR windows where a UE transmits a first PRACH preamble in a first RO with a first spatial setting and a second PRACH preamble in a second RO with a second spatial setting illustrated in FIG. 6 is for illustration only. FIG. 6 does not limit the scope of this disclosure to any particular implementation of the example 600 of multiple RAR windows where a UE transmits a first PRACH preamble in a first RO with a first spatial setting and a second PRACH preamble in a second RO with a second spatial setting.

In the example illustrated in FIG. 6, where the UE (such as the UE 116) transmits a first PRACH preamble in a first RO with a first spatial setting associated to a first TCI state and a second PRACH preamble in a second RO with a second spatial setting associated to a second TCI state, the UE is configured with a first RAR window and a second RAR window. Upon transmission of the first PRACH preamble in the first RO, the MAC entity starts a first RAR window ra-ResponseWindow-TCI1 configured in RACH-ConfigCommon at the first PDCCH occasion after the end of the first PRACH preamble transmission in the first RO (time interval Ta(1) in FIG. 6), and monitors a PDCCH for RARs identified by the RA-RNTI while the first ra-ResponseWindow-TCI1 is running. If the UE receives an UL grant during the RAR window, a Msg3 PUSCH can be transmitted after a minimum time from the last symbol of the PDSCH reception conveying the RAR message with the RAR UL grant wherein the minimum time depends on the processing time of PDSCH and preparation time for PUSCH which are subject to a UE capability (time interval Tb(1) in FIG. 6). For the second RAR window, upon transmission of the second PRACH preamble in the second RO, the MAC entity starts a second RAR window ra-ResponseWindow-TCI2 configured in RACH-ConfigCommon at the first PDCCH occasion after the end of the second PRACH preamble transmission in the second RO (time interval Ta(2) in FIG. 6), and monitors a PDCCH for RARs identified by the RA-RNTI while the second ra-Response Window-TCI2 is running. The length of ra-Response Window-TCI1 and ra-Response Window-TCI2 can be the same or different.

FIG. 7 illustrates an example method 700 for a UE to monitor a PDCCH for RARs corresponding to a first PRACH transmission using a first spatial setting associated with a first TCI state and a second PRACH transmission using a second spatial setting associated with a second TCI state in a first and in a second RAR window, respectively, according to the disclosure. The embodiment of the example method 700 for a UE to monitor a PDCCH for RARs corresponding to a first PRACH transmission using a first spatial settings associated with a first TCI state and a second PRACH transmission using a second spatial settings associated with a second TCI state in a first and in a second RAR window, respectively, illustrated in FIG. 7 is for illustration only. FIG. 7 does not limit the scope of this disclosure to any particular implementation of the example method 700 for a UE to monitor a PDCCH for RARs corresponding to a first and a second PRACH transmission in a first and in a second RAR window.

As illustrated in FIG. 7, at step 710, a UE (such as the UE 116) is configured with a first RAR window and a second RAR window by higher layer parameters ra-ResponseWindow-TCI1 and ra-ResponseWindow-TCI2. At step 720, the UE transmits a first PRACH preamble in a first RO with a first spatial setting associated to a first TCI state and a second PRACH preamble in a second RO with a second spatial setting associated to a second TCI state. At step 730, the UE monitors the PDCCH for RARs corresponding to the first PRACH transmission while the ra-ResponseWindow-TCI1 is running, and monitors the PDCCH for RARs corresponding to the second PRACH transmission while the ra-ResponseWindow-TCI2 is running. At step 740, the UE receives an UL grant corresponding to the first PRACH transmission during the first RAR window, and receives an UL grant corresponding to the second PRACH transmission during the second RAR window.

At step 710, alternatively the UE can be configured with a first RAR window and a second RAR window and is provided an RAR window length by ra-ResponseWindow that applies to both RAR windows.

At step 740, it is also possible that the UE receives an UL grant corresponding to the first PRACH transmission during the first RAR window and does not receive an UL grant corresponding to the second PRACH transmission before ra-ResponseWindow-TCI2 expires, or vice versa, that the UE does not receive an UL grant corresponding to the first PRACH transmission before ra-ResponseWindow-TCI1 expires and receives an UL grant corresponding to the second PRACH transmission during the second RAR window.

When a UE is configured to select an RAR message with an UL grant for a Msg3 PUSCH transmission among the received RAR messages during the two RAR windows, the timing for the Msg3 PUSCH transmission depends on the latest received RAR and/or on when the latest RAR window expires.

In a first example, if the PRACH transmission is successful for both the first PRACH and the second PRACH, the UE detects the first DCI format 1_0 with CRC scrambled by the corresponding RA-RNTI and receives a first transport block in a corresponding first PDSCH within the first RAR window, and the higher layers indicate a first uplink grant to the physical layer, and the UE detects the second DCI format 1_0 with CRC scrambled by the corresponding RA-RNTI and receives a second transport block in a corresponding second PDSCH within the second RAR window, and the higher layers indicate a second uplink grant to the physical layer, the UE determines whether to transmit a Msg3 PUSCH with the first UL grant corresponding to the first PRACH or with the second UL grant corresponding to the second PRACH. The timeline for transmission of the determined Msg3 PUSCH depends on the time of the reception of the latest PDCCH/PDSCH and corresponding UL grant, and/or on when the latest RAR window expires. In the example of FIG. 4, the latest UL grant corresponds to the second PRACH transmission, and if the UE determines to transmit Msg3 PUSCH scheduled by the UL grant in the second RAR message, the Msg3 PUSCH transmission starts after a time interval Tb(2) from the reception of the second PDSCH with the second RAR message ending in slot n and uses the second spatial setting. If the UE determines to transmit Msg3 PUSCH scheduled by the UL grant in the first RAR message, the transmission of the Msg3 PUSCH starts after a time interval Tc from the reception of the second PDSCH with the second RAR message ending in slot n which is the latest received RAR, wherein the interval Tc can be same as Tb(2), and Msg3 PUSCH transmission uses the first spatial setting corresponding to the first TCI state. It is also possible that the interval Tc is different than Tb(2), for example Tc is smaller than Tb(2).

In a second example, the UE receives a RAR message corresponding to the first PRACH transmission and does not receive a RAR message corresponding to the second PRACH transmission. The Msg3 PUSCH transmission scheduled according to the first UL grant is transmitted with the first spatial setting and starts after an interval Td from the expiration of the second RAR window.

It is also possible that the UE is configured to transmit a Msg3 PUSCH after receiving a first RAR message in any of the RAR windows. In the example of FIG. 4, when the UE receives the first RAR message corresponding to the first PRACH transmission, the UE transmits the Msg3 PUSCH scheduled by the first UL grant in the first RAR message after a time interval Tb(1) from the reception of the first PDSCH with the first RAR message ending in slot n, and uses the first spatial setting corresponding to the first TCI state. The overall RAR procedure is then considered successful after reception of the first RAR message, the MAC entity shall stop monitoring RARs and terminate the first RAR window and the second RAR window.

FIG. 8 illustrates an example method 800 for a UE to monitor a PDCCH for RARs corresponding to a first and a second PRACH transmission in a first and in a second RAR window, respectively, according to embodiments of the disclosure. The embodiment of the example method 800 for a UE to monitor a PDCCH for RARs corresponding to a first and a second PRACH transmission in a first and in a second RAR window, respectively, illustrated in FIG. 8 is for illustration only. FIG. 8 does not limit the scope of this disclosure to any particular implementation of the example method 800 for a UE to monitor a PDCCH for RARs corresponding to a first and a second PRACH transmission in a first and in a second RAR window, respectively.

As illustrated in FIG. 8, at step 810, a UE (such as the UE 116) is configured with a first RAR window and a second RAR window by higher layer parameters ra-ResponseWindow-TCI1 and ra-ResponseWindow-TCI2. At step 820, the UE transmits a first PRACH preamble in a first RO with a first spatial setting and a second PRACH preamble in a second RO with a second spatial setting 820. At step 830, the UE receives an UL grant corresponding to the first PRACH transmission during the first RAR window. At step 840, the UE stops monitoring for RARs and terminates the first and the second RAR windows.

FIG. 9 illustrates an illustrates an example 900 where a UE transmits a first PRACH preamble in a first RO with a first spatial setting and a second PRACH preamble in a second RO with a second spatial setting, where the second RO is after the first RO, and is configured with one RAR window according to embodiments of the disclosure. The embodiment of the example 900 where a UE transmits a first PRACH preamble in a first RO with a first spatial setting and a second PRACH preamble in a second RO with a second spatial setting, where the second RO is after the first RO, and is configured with one RAR window illustrated in FIG. 9 is for illustration only. FIG. 9 does not limit the scope of this disclosure to any particular implementation of the example 900 where a UE transmits a first PRACH preamble in a first RO with a first spatial setting and a second PRACH preamble in a second RO with a second spatial setting, where the second RO is after the first RO, and is configured with one RAR window.

In the example illustrated in FIG. 9, the UE (such as the UE 116) transmits a first PRACH preamble in a first RO with a first spatial setting corresponding to a first TCI state and a second PRACH preamble in a second RO with a second spatial setting corresponding to a second TCI state, wherein the second RO is after the first RO, and a single RAR window is configured. Upon transmission of the first PRACH preamble in the first RO, the MAC entity starts a first RAR window ra-ResponseWindow-TCI configured in RACH-ConfigCommon at the first PDCCH occasion from the end of the first PRACH preamble transmission in the first RO and monitors the PDCCH for RARs corresponding to the first PRACH transmission while the ra-Response Window-TCI is running. The UE also monitors the PDCCH for RARs corresponding to the second PRACH transmission starting from the first PDCCH occasion after the end of the second PRACH preamble transmission in the second RO. In the time interval when the UE is monitoring for a RAR corresponding to either the first or the second PRACH transmission, the UE passes the transport block of the PDSCH to higher layers that parse the transport block for a random access preamble identity (RAPID) associated with the first or the second PRACH transmission. If the higher layers identify the RAPID in the RAR message of the transport block, the higher layers indicate an uplink grant to the physical layer. The overall RAR procedure is then considered successful after reception of the first RAR message, the MAC entity shall stop monitoring RARs and terminate the RAR window.

FIG. 10 illustrates an example method 1000 for a UE to monitor a PDCCH for RARs corresponding to a first PRACH transmission and a second PRACH transmission during one RAR window, according to embodiments of the disclosure. The embodiment of the example method 1000 for a UE to monitor a PDCCH for RARs corresponding to a first and a second PRACH transmission during one RAR window illustrated in FIG. 10 is for illustration only. FIG. 10 does not limit the scope of this disclosure to any particular implementation of the example method 1000 for a UE to monitor a PDCCH for RARs corresponding to a first and a second PRACH transmission during one RAR window.

As illustrated in FIG. 10, at step 1010, a UE (such as the UE 116) is configured with first and a second RAR windows by higher layer parameters ra-ResponseWindow-TCI1 and ra-ResponseWindow-TCI2. At step 1020, the UE transmits a first PRACH preamble in a first RO with a first spatial setting and a second PRACH preamble in a second RO with a second spatial setting. At step 1030, the UE determines a start of an RAR window based on a first PDCCH occasion after the end of the first PRACH transmission. At step 1040, the UE monitors for an RAR corresponding to the first PRACH transmission starting from the beginning of the RAR window, and for an RAR corresponding to the second PRACH transmission starting from a first PDCCH occasion after the end of the second PRACH transmission.

FIG. 11 illustrates an example 1100 when a UE monitors a PDCCH for RARs corresponding to a first PRACH transmission and a second PRACH transmission during one RAR window according to embodiments of the disclosure. The embodiment of the example 1100 when a UE monitors a PDCCH for RARs corresponding to a first and a second PRACH transmission during one RAR window illustrated in FIG. 11 is for illustration only. FIG. 11 does not limit the scope of this disclosure to any particular implementation of the example 1100 when a UE monitors a PDCCH for RARs corresponding to a first and a second PRACH transmission during one RAR window.

In a first example, when a UE (such as the UE 116) monitors a PDCCH for RARs corresponding to a first PRACH transmission and a second PRACH transmission during one RAR window, after receiving a first UL grant corresponding to the first PRACH transmission, the UE continues to monitor for an RAR corresponding to the second PRACH transmission until the UE receives a second UL grant corresponding to the second PRACH transmission or the RAR window expires. As illustrated in FIG. 11, the RAR window starts at time to where the UE starts attempting to detect a first RAR reception corresponding to the first PRACH transmission with the first spatial setting. At time t1 the UE starts attempting to detect a second RAR reception corresponding to the second PRACH transmission with the second spatial setting. If at time t2 the UE receives an UL grant corresponding to the first PRACH transmission, the UE stops monitoring for RARs corresponding to the first PRACH transmission, but the MAC entity does not stop the RAR window. During the time interval Interval-2 the UE monitors for RARs corresponding to both the first PRACH transmission and the second PRACH transmission, and when the UE receives a transport block in a corresponding PDSCH, the UE passes the transport block to higher layers that parse the transport block for a RAPID associated with the first PRACH transmission or the second PRACH transmission. If the higher layers identify the RAPID associated with the first PRACH transmission or the second PRACH transmission in the RAR message of the transport block, the higher layers indicate an uplink grant to the physical layer. In time intervals Interval-1 and Interval-3, the UE monitors for RAR corresponding to the first PRACH transmission and the second PRACH transmission, respectively.

When a UE monitors a PDCCH for RARs corresponding to a first and a second PRACH transmission during one RAR window, after receiving an UL grant corresponding to either the first PRACH transmission or the second PRACH transmission, the RAR reception procedure can be considered successful, and the MAC entity shall stop monitoring RARs and stop the ra-ResponseWindow. Then the UE transmits Msg3 PUSCH according to the received UL grant using the corresponding spatial setting.

FIG. 12 illustrates an example method 1200 for a UE to monitor for RARs corresponding to a first PRACH transmission and a second PRACH transmission during one RAR window, wherein the first and second PRACH transmission can be transmitted in ROs in the same time resource and different frequency resources, and monitoring for RAR starts after transmission in the second RO, according to embodiments of the disclosure. The embodiment of the example method 1200 for a UE to monitor for RARs corresponding to a first PRACH transmission and a second PRACH transmission during one RAR window, wherein the first and second PRACH transmission can be transmitted in ROs in the same time resource and different frequency resources, and monitoring for RAR starts after transmission in the second RO illustrated in FIG. 12 is for illustration only. FIG. 12 does not limit the scope of this disclosure to any particular implementation of the example method 1200 for a UE to monitor for RARs corresponding to a first PRACH transmission and a second PRACH transmission during one RAR window, wherein the first and second PRACH transmission can be transmitted in ROs in the same time resource and different frequency resources, and monitoring for RAR starts after transmission in the second RO. Subject to a configuration, monitoring for RAR can stop after the UE receives an UL grant.

As illustrated in FIG. 12, at step 1210, a UE (such as the UE 116) is configured with an RAR window by higher layer parameter ra-ResponseWindow. At step 1220, the UE transmits a first PRACH preamble in a first RO with a first spatial setting and a second PRACH preamble in a second RO with a second spatial setting. At step 1230, the UE monitors for RARs corresponding to the first and second PRACH transmissions starting from a first PDCCH occasion after the end of the second PRACH transmission. At step 1240, the UE receives an UL grant corresponding to the first PRACH transmission, and stops monitoring for RAR corresponding to the first PRACH transmission. At step 1250, when the UE is configured to stop RAR detection after receiving a first UL grant (Configuration-A), the UE stops monitoring for RAR corresponding to the second PRACH transmission and at step 1260 terminates the RAR window; otherwise, at step 1270, the UE monitors for RAR corresponding to the second PRACH transmission.

FIG. 13 illustrates an example method 1300 for a UE to receive an RAR according to embodiments of the disclosure. The embodiment of the example method 1300 for a UE to receive an RAR illustrated in FIG. 13 is for illustration only. FIG. 13 does not limit the scope of this disclosure to any particular implementation of the example method 1300 for a UE to receive an RAR.

As illustrated in FIG. 13, at step 1310, a UE (such as the UE 116) is provided information of the RAR window for RAR receptions corresponding to the PRACH transmissions. At step 1320, the UE transmits a first PRACH preamble in a first RO with a first spatial setting and a second PRACH preamble in a second RO with a second spatial setting. At step 1330, the UE attempts to detect a PDCCH scheduling an RAR corresponding to the first RO of the first PRACH preamble transmission using the first spatial setting during the first-time interval. At step 1340, when the UE receives the uplink grant corresponding to the first PRACH transmission, then at step 1350 the UE transmits a Msg3 PUSCH with the first spatial setting; otherwise, at step 1360, the UE attempts to detect a PDCCH scheduling an RAR corresponding to the second RO of the second PRACH preamble transmission with the second spatial setting during a second time interval.

It is also possible that after a UE receives an uplink grant corresponding to one of the PRACH transmissions, if the RAR window is still running, the UE attempts to receive RARs corresponding to other PRACH transmissions. For example, if the UE transmits four PRACH preambles in four ROs using four spatial settings, and receives an uplink grant corresponding to the second PRACH transmission during a second time interval within the RAR-window, the UE transmits a Msg3 PUSCH according to the received uplink grant using the second spatial setting and attempts to receive RAR receptions corresponding to a third and a fourth PRACH transmission during a third and a fourth time interval within the RAR window. If the Msg3 PUSCH transmission fails, and the UE received an uplink grant corresponding to the fourth PRACH transmission, the UE transmits Msg3 PUSCH according to the received uplink grant corresponding to the fourth PRACH transmission using the fourth spatial setting.

FIG. 14 illustrates an example method 1400 for a UE to receive an RAR according to embodiments of the disclosure. The embodiment of the example method 1400 for a UE to receive an RAR illustrated in FIG. 14 is for illustration only. FIG. 14 does not limit the scope of this disclosure to any particular implementation of the example method 1400 for a UE to receive an RAR.

As illustrated in FIG. 14, at step 1410, a UE (such as the UE 116) is provided information of the RAR window for RAR receptions corresponding to PRACH transmissions. At step 1420, the UE transmits a number N of PRACH preambles in corresponding N ROs using N spatial settings. At step 1430, the UE attempts to detect a PDCCH scheduling an RAR corresponding to a PRACH preamble transmission during a first-time interval within the RAR window. At step 1440, the UE receives a first UL grant corresponding to the first PRACH transmission and transmits a Msg3 PUSCH based on the received first UL grant using the first spatial setting. At step 1450, the UE receives a second UL grant corresponding to the second PRACH transmission. At step 1460, if a positive HARQ-ACK for the Msg3 PUSCH transmission is received, then at step 1470, the random-access procedure is complete; otherwise at step 1480, the UE transmits a Msg3 PUSCH based on the received second uplink grant using the second spatial setting.

A UE can continue to attempt detection of other PDCCH scheduling an RAR reception even after detecting a first PDCCH. When the UE detects multiple PDCCHs within the RAR window, the UE can select one of the detected PDCCH to continue the RAR receptions based on a quality of the received PDCCH. It is also possible that the UE receives the transport blocks in corresponding PDSCHs, and then determines which transport block to pass to higher layers. Then the UE transmits Msg3 PUSCH according to the received uplink grant corresponding to the selected transport block.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to transmit:
    a first physical random access channel (PRACH) preamble in a first PRACH occasion (RO) using a first spatial setting, and
    a second PRACH preamble in a second RO using a second spatial setting; and
a processor operably coupled to the transceiver, the processor configured to determine:
    a first time window over a first number of symbols for reception of a first physical downlink control channel (PDCCH) scheduling reception of a first physical downlink shared channel (PDSCH) using a first transmission configuration indication (TCI) state, wherein the first PDSCH provides a first random access response (RAR) message associated with the first PRACH preamble transmission, and
    a second time window over a second number of symbols for reception of a second PDCCH scheduling reception of a second PDSCH using a second TCI state, wherein the second PDSCH provides a second RAR message associated with the second PRACH preamble transmission, wherein:
    the first number of symbols and the second number symbols overlap,
    either the first PDSCH or the second PDSCH ends earlier than, respectively, the second PDSCH or the first PDSCH,
wherein the transceiver is further configured to:
    receive the one of the first PDSCH and the second PDSCH that ends earlier, and
    skip reception for the other of the first PDSCH and the second PDSCH.

2. The UE of claim 1, wherein:
the first RO or the second RO is from a set of ROs,
ROs from the set of ROs have same time resources, and
ROs from the set of Ros are associated with different SS/PBCH blocks.

3. The UE of claim 1, wherein:
the first number of symbols and the second number of symbols overlap,
the first and second RAR messages include information for scheduling transmission of first and second physical uplink shared channels (PUSCHs), respectively, and
the transceiver is further configured to:
    transmit the first PUSCH using the first spatial setting, and transmit the second PUSCH using the second spatial
setting.

4. The UE of claim 1, wherein:

the first RAR message includes information for schedul-
ing transmission of a first physical uplink shared chan-
nel (PUSCH), the second RAR message includes information schedul-
ing transmission of a second PUSCH, and the transceiver is further configured to transmit:

the first PUSCH using the first spatial setting after a
first number of symbols from an end of the first time
window, and the second PUSCH using the second spatial setting
after a second number of symbols from an end of the
second time window.

5. The UE of claim 1, wherein:

the first RO and the second RO have different time
resources, the processor is further configured to determine a third
time window over a third number of symbols, the third number of symbols comprises the first and
second numbers of symbols, the second number of symbols are after the first number
of symbols, and the transceiver is further configured to:

receive the first PDCCH and first PDSCH using the first
TCI state, receive the second PDCCH and second PDSCH using
the second TCI state, and terminate reception over the third time window after
the third number of symbols.

6. The UE of claim 5, wherein:

the first RAR message includes information for schedul-
ing transmission of a first physical uplink shared chan-
nel (PUSCH), the second RAR message includes information for sched-
uling transmission of a second PUSCH, and the transceiver is further configured to transmit the first
PUSCH or the second PUSCH after the third number of
symbols from an end of the third time window.

7. A base station (BS) comprising:

a transceiver configured to receive:

a first physical random access channel (PRACH) pre-
amble in a first PRACH occasion (RO) using a first
spatial setting, and a second PRACH preamble in a second RO using a
second spatial setting; and a processor operably coupled to the transceiver, the pro-
cessor configured to determine:

a first time window over a first number of symbols for
reception of a first physical downlink control channel
(PDCCH) scheduling reception of a first physical
downlink shared channel (PDSCH) using a first
transmission configuration indication (TCI) state,
wherein the first PDSCH provides a first random
access response (RAR) message associated with the
first PRACH preamble reception, and a second time window over a second number of sym-
bols for reception of a second PDCCH scheduling
reception of a second PDSCH using a second TCI
state, wherein the second PDSCH provides a second
RAR message associated with the second PRACH
preamble reception, wherein:

the first number of symbols and the second number of
symbols overlap, either the first PDSCH or the second PDSCH ends
earlier than, respectively, the second PDSCH or the
first PDSCH, and wherein the transceiver is further configured to:

transmit the one of the first PDSCH and the second
PDSCH that ends earlier, and skip transmission for the other of the first PDSCH and
the second PDSCH.

8. The BS of claim 7, wherein:

the first RO or the second RO is from a set of ROs,

ROs from the set of ROs have same time resources, and

ROs from the set of ROs are associated with different
SS/PBCH blocks.

9. The BS of claim 7, wherein:

the first number of symbols and the second number of
symbols overlap, the first and second RAR messages include information
for scheduling reception of first and second physical
uplink shared channels (PUSCHs), respectively, and the transceiver is further configured to:

receive the first PUSCH using the first spatial setting,
and receive the second PUSCH using the second spatial
setting.

10. The BS of claim 7, wherein:

the first RO and the second RO have different time
resources, the processor is further configured to determine a third
time window over a third number of symbols, the third number of symbols comprises the first and
second numbers of symbols, the second number of symbols are after the first number
of symbols, and the transceiver is further configured to:

transmit the first PDCCH and first PDSCH using the
first TCI state, transmit the second PDCCH and second PDSCH using
the second TCI state, and terminate reception over the third time window after
the third number of symbols.

11. The BS of claim 10, wherein:

the first RAR message includes information for schedul-
ing reception of a first physical uplink shared channel
(PUSCH), the second RAR message includes information for sched-
uling reception of a second PUSCH, and the transceiver is further configured to receive the first
PUSCH or the second PUSCH after the third number of
symbols from an end of the third time window.

12. A method comprising:

transmitting:

a first physical random access channel (PRACH) pre-
amble in a first PRACH occasion (RO) using a first
spatial setting, and a second PRACH preamble in a second RO using a
second spatial setting;

determining:

a first time window over a first number of symbols for
reception of a first physical downlink control channel
(PDCCH) scheduling reception of a first physical
downlink shared channel (PDSCH) using a first
transmission configuration indication (TCI) state,
wherein the first PDSCH provides a first random
access response (RAR) message associated with the
first PRACH preamble transmission, and a second time window over a second number of sym-
bols for reception of a second PDCCH scheduling reception of a second PDSCH using a second TCI state, wherein the second PDSCH provides a second RAR message associated with the second PRACH preamble transmission, wherein:

the first number of symbols and the second number of symbols overlap, either the first PDSCH or the second PDSCH ends earlier than, respectively, the second PDSCH or the first PDSCH;

receiving the one of the first PDSCH and the second PDSCH that ends earlier; and skipping reception for the other of the first PDSCH and the second PDSCH.

13. The method of claim 12, wherein:

the first RO or the second RO is from a set of ROs,

ROs from the set of ROs have same time resources, and

ROs from the set of ROs are associated with different SS/PBCH blocks.

14. The method of claim 12, wherein:

the first number of symbols and the second number of symbols overlap, the first and second RAR messages include information for scheduling transmission of first and second physical uplink shared channels (PUSCHs), respectively, and the method further comprises:

transmitting the first PUSCH using the first spatial setting, and transmitting the second PUSCH using the second spatial setting.

15. The method of claim 12, wherein:

the first RAR message includes information for scheduling transmission of a first physical uplink shared channel (PUSCH), the second RAR message includes information scheduling transmission of a second PUSCH, and the method further comprises transmitting:

the first PUSCH using the first spatial setting after a first number of symbols from an end of the first time window, and the second PUSCH using the second spatial setting after a second number of symbols from an end of the second time window.

16. The method of claim 12, wherein:

the first RO and the second RO have different time resources;

the method further comprises determining a third time window over a third number of symbols;

the third number of symbols comprises the first and second numbers of symbols;

the second number of symbols are after the first number of symbols;

receiving (i) the first PDCCH and the first PDSCH or (ii) the second PDCCH and the second PDSCH further comprises:

receiving the first PDCCH and first PDSCH using the first TCI state, and receiving the second PDCCH and second PDSCH using the second TCI state; and the method further comprises terminating reception over the third time window after the third number of symbols.

17. The method of claim 16, wherein:

the first RAR message includes information for scheduling transmission of a first physical uplink shared channel (PUSCH), and the second RAR message includes information for scheduling transmission of a second PUSCH; and the method further comprises transmitting the first PUSCH or the second PUSCH after the third number of symbols from an end of the third time window.

* * * * *